US011055619B2

(12) United States Patent
Little

(10) Patent No.: US 11,055,619 B2
(45) Date of Patent: Jul. 6, 2021

(54) SYSTEMS AND METHODS FOR ENERGY EXPERT COLLABORATION FEATURES

(71) Applicant: SCHNEIDER ELECTRIC USA, INC., Palatine, IL (US)

(72) Inventor: Marcus Little, Victoria (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 1516 days.

(21) Appl. No.: 14/898,540

(22) PCT Filed: Jun. 21, 2013

(86) PCT No.: PCT/US2013/047046
§ 371 (c)(1),
(2) Date: Dec. 15, 2015

(87) PCT Pub. No.: WO2014/204486
PCT Pub. Date: Dec. 24, 2014

(65) Prior Publication Data
US 2016/0132772 A1 May 12, 2016

(51) Int. Cl.
*G06N 5/02* (2006.01)
*G06N 5/04* (2006.01)
*G06Q 50/06* (2012.01)

(52) U.S. Cl.
CPC ............... *G06N 5/022* (2013.01); *G06N 5/04* (2013.01); *G06Q 50/06* (2013.01)

(58) Field of Classification Search
CPC ........ Y04S 20/322; Y04S 50/10; Y04S 40/24; Y04S 10/18; Y04S 20/42; Y04S 10/16;
(Continued)

(56) References Cited

U.S. PATENT DOCUMENTS

2007/0003914 A1  1/2007  Yang
2007/0239317 A1  10/2007  Bogolea et al.
(Continued)

FOREIGN PATENT DOCUMENTS

WO  2012149138 A1  11/2012
WO  2012177871 A1  12/2012
WO  2013089782 A2  6/2013

OTHER PUBLICATIONS

Notification of Transmittal of the International Search Report and the Written Opinion of the International Searching Authority from corresponding PCT/US2013/047046 dated Jan. 3, 2014.

*Primary Examiner* — Eric Nilsson
(74) *Attorney, Agent, or Firm* — Lando & Anastasi, LLP

(57) ABSTRACT

According to various aspects, an energy management system is provided for generating a user request for information. According to one embodiment, the user selects energy management information to initiate a request for information. The system captures user context, the selected information, and determines information that is necessary to resolve the user's request. In some embodiments, the system requires explicit consent prior to sharing the necessary information with potential responders. In other embodiments, the system can require payment before proceeding. User requests can be routed to potential responders based on user context (e.g., what energy management information was being viewed, what report was being displayed, what actions the user was taking, etc.). User context can also include information on the user so a compatible responder with subject matter expertise can be identified. Generated responses can then be returned in-line in same context (e.g., report) from which the user generated the request.

20 Claims, 7 Drawing Sheets

(58) Field of Classification Search
CPC .......... Y04S 10/54; Y04S 10/56; Y04S 20/32;
Y04S 20/48; Y04S 10/30; Y04S 10/40;
Y04S 20/38; Y04S 20/40; Y04S 20/52;
Y04S 40/18; Y04S 40/22; G06N 5/022;
G06N 5/04; G06Q 50/06
See application file for complete search history.

(56) References Cited

U.S. PATENT DOCUMENTS

| | | |
|---|---|---|
| 2009/0076749 A1 | 3/2009 | Nasle |
| 2009/0231152 A1 | 9/2009 | Tung ................ G06F 1/206 340/660 |
| 2009/0299812 A1 | 12/2009 | Ray ................ G06Q 30/02 705/35 |
| 2010/0332373 A1 | 12/2010 | Crabtree ............ G06Q 40/04 705/37 |
| 2011/0184581 A1 | 7/2011 | Storch et al. |
| 2012/0060106 A1 | 3/2012 | Moxley et al. |
| 2012/0159349 A1 | 6/2012 | Kansky ................ H04L 41/22 715/752 |
| 2012/0159635 A1 | 6/2012 | He et al. |
| 2012/0204052 A1 | 8/2012 | Brown |

SYSTEMS AND METHODS FOR ENERGY EXPERT COLLABORATION FEATURES

CROSS-REFERENCE TO RELATED APPLICATIONS

This application is a U.S. National Stage Application under 35 U.S.C. § 371 of International Application No. PCT/US2013/047046, filed Jun. 21, 2013, titled SYSTEMS AND METHODS FOR ENERGY EXPERT COLLABORATION FEATURES, which is hereby incorporated herein by reference in its entirety.

BACKGROUND

1. Technical Field

The technical field relates generally to expert and domain matched collaboration features and, more particularly, to systems and methods for providing collaboration features within the context of a user's interaction with energy management systems and/or devices.

2. Background Discussion

Many conventional energy management systems are available that provide energy monitoring, management, and support capabilities to users. Some implementations can be configured to suit the environment in which management functions are required (e.g., data center energy management software and/or systems, commercial building energy management software and/or systems, and hospital environment solutions, etc.). Conventional approaches deliver energy management information to users through static or dynamic reports that permit such users to interact with the reported information at a variety of levels of detail (e.g., based on energy use/consumption/load for groups of devices located at a site, for specific types of devices, etc.). Some user interfaces within management systems and/or devices are configured to allow a user to navigate information on energy management at different levels of detail. For example, the user interface can display navigable reports on the energy management information, which can include health reports for devices, energy load reports, energy optimization reports, among other options.

In many situations, such conventional systems provide overwhelming volumes of information, or provide summarizations of data that are not easily interpreted by users. Even users with experience in energy management can have difficulty in interpreting the energy management information provided.

SUMMARY

It is appreciated that there is a need to connect end user populations to systems and responders who are the most capable of addressing the user's needs and/or requests for information. For example, such connections may be performed using collaboration features. Is it further realized that the collaboration features can be more effective if the interaction is responsive to user selection of energy management information within such reports. For example, such energy management information may be delivered as part of management, monitoring, and/or maintenance reporting. Further, the collaboration features can be configured to identify and/or provide context information in conjunction with user selection to enable routing of questions, information requests, recommendation requests, etc., to the entities (e.g., domain experts) who are the most capable of addressing the user's needs. In additional embodiments, the collaboration features can deliver responsive information to the user directly within a viewed report, eliminating any need for the user to exit the energy management context in which their issue arose.

Accordingly, various aspects and embodiments of an energy management system are provided that include collaboration features and/or services. The energy management system can be configured to include user interfaces that provide user access to collaboration features in conjunction with energy management information and reports on the same. In some examples, the user may select collaboration features within reports generated on energy consumption, energy optimization, energy management, device consumption, load optimization, load distribution, battery health, among other options. Some embodiments can be configured to accept user selection within the energy management information shown within respective reports or other display.

According to one embodiment, in a report on power quality ("PQ") tracking and/or events, the user interface of the energy management system can be configured to accept selection of subsets of the energy management information within the displayed PQ report. For instance, responsive to the user's selection within the PQ report, the system can be configured to define a question to be answered, automatically capture associated information (e.g., logs and sensor data used to generate the report, device settings, etc.), and incorporate the selected energy management information for routing to a responder or response subsystem. In some embodiments, the system automatically routes a bundled request (e.g., question, energy management information, and any associated information) to a subject matter and/or context expert. In one example, the energy management system routes questions based on user selection of the energy management information. In further embodiments, routing by the system can also be tailored to user specific information. The user specific information can include user credentials, user background, position, job description, among other options. In some embodiments, the user specific information can be used in addition to and/or separately from the specified energy management information to route requests to the matched responder. For example, engineers seeking contextual advice can be further routed to technical experts within a given subject, and site managers seeking contextual advice on the same information can be routed to management experts.

Generated responses can be delivered to the user directly. In some embodiments, the returned responses can be integrated directly into the systems, devices, and/or displayed reports from which the user generated an expert request. For example, the response to the user questions can be integrated into a display of the PQ report from which the user identified selected PQ information. In some embodiments, the system provides access to responses through multiple pathways and functions including, for example, returned messages to the user, in-line delivery (e.g., as notes, annotations, video recordings, voice recordings, etc.) within energy management reports, among other options.

According to one aspect, a system for delivering expert advice responsive to user content selection is provided. The system comprises at least one processor operatively connected to a memory; a UI component, executed by the at least one processor, configured to receive a user selection of energy management information as part of a request for information; a routing component, executed by the at least one processor, configured to determine routing information for the request for information based on, at least in part, the user selection of energy management information, wherein determining routing information includes determining automatically a subject matter match between the user selection of energy management information and a responder for the request for information; and a communication component, executed by the at least one processor, configured to communicate the request for information to the responder and return responsive information generated by the responder to the user.

In one embodiment, the UI component is configured to display within a user interface energy management information regarding power and consumption; and accept within the user interface selection of energy management information. In one embodiment, the UI component is configured to display creation tools for generating the request for information, wherein the creation tools are configured to respond to user selection within the user interface displaying energy management information.

In one embodiment, the system further comprises an analysis component configured to identify, automatically, information associated with the user selection of energy management information. In one embodiment, the analysis component is configured to generate a package of information as part of the request for information, wherein the package of information includes the information associated with the user selection of energy management information. In one embodiment, the analysis component is configured to access user context including at least one of user context associated with the user selection of energy management information and user profile information.

In one embodiment, the routing component is configured to determine the routing information by determining a match between at least the user context and profile information on candidate responders. In one embodiment, the routing component is configured to determine the routing information by determining compatibility between the requesting user and at least one candidate responder. In one embodiment, the communication component is configured to communicate a response to the user request for information in-line. In one embodiment, the UI component is configured to display visual indicators for accessing the response within a display from which the user selected the energy management information.

According to one aspect, a computer implemented method for delivering expert advice responsive to user content selection is provided. The method comprises acts of receiving, by a computer system, a user selection of energy management information as part of a request for information; determining, by the computer system, routing information for the request for information based on, at least in part, the user selection of energy management information, wherein determining the routing information includes an act of automatically determining a subject matter match between the selected energy management information and a responder for the request for information; and communicating, by the computer system, the request for information to the responder and returning responsive information generated by the responder to the user.

In one embodiment, the method further comprises displaying within a user interface energy management information regarding power and consumption; and accepting within the user interface selection of energy management information. In one embodiment the method further comprises displaying creation tools for generating the request for information, wherein the creation tools are configured to respond to user selection within the user interface displaying energy management information.

In one embodiment, the method further comprises an analysis component configured to identify, automatically, information associated with the user selection of energy management information. In one embodiment, the method further comprises generating a package of information as part of the request for information, wherein the package of information includes the information associated with the user selection of energy management information. In one embodiment, the method further comprises accessing user context including at least one of user context associated with the selected energy management information and user profile information.

In one embodiment, the act of determining the routing information includes determining a match between at least the user context and profile information on candidate responders. In one embodiment, the act of determining the routing information includes determining compatibility between the requesting user and at least one candidate responder. In one embodiment, the method further comprising communicating a response to the user request for information in-line.

According to one aspect a non-transitory computer readable medium is provided. The medium comprising stored thereon sequences of instruction for delivering expert advice responsive to user content selection including instructions that when executed cause at least one processor of a computer system to receive a user selection of energy management information as part of a request for information; determine routing information for the request for information based on, at least in part, the user selection of energy management information, wherein determining the routing information includes automatically determining a subject matter match between the user selection of energy management information and a responder for the request for information; and communicate the request for information to the responder and return responsive information generated by the responder to the user. In various embodiments, the non-transitory computer readable medium includes instructions for perform any of the preceding method steps.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
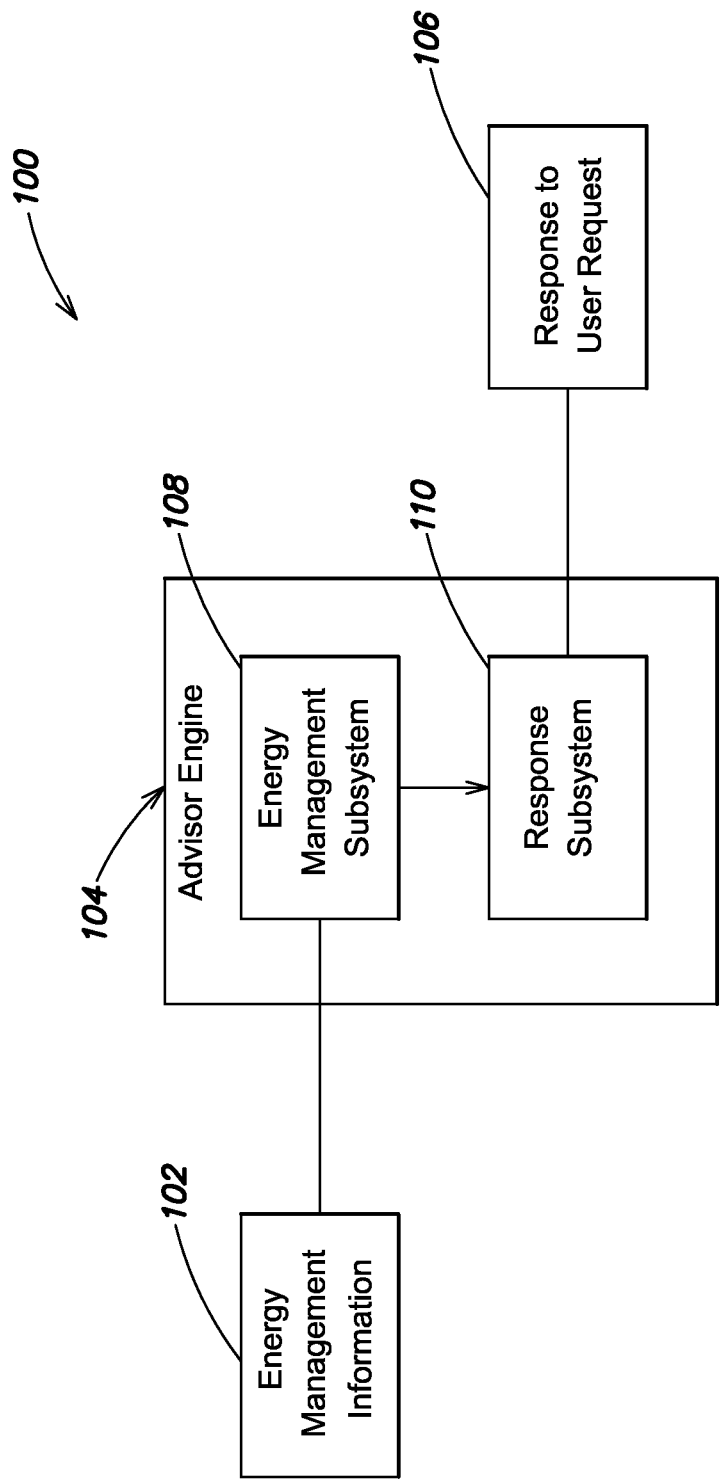
FIG. 1 is a block diagram of an example energy management system, including an advisor engine, according to one embodiment.

At least some embodiments disclosed herein include apparatus and processes for defining, routing, and responding to user questions regarding energy management information. According to one embodiment, an energy management system is configured to provide expert advice functions through a user interface coupled to energy management software and/or subsystems. The user interface can be configured to accept user specification of requests for information, request for expert advices, etc. The user interface can be configured to allow an end user to specify energy management information presented by their energy management software and/or subsystem as the basis of a request. The user's request can be routed to a subject matter and/or context expert who can facilitate user understanding and resolution of the specified energy management information.

According to one embodiment, the system is configured to accept user specification of data within energy management information including, for example, information displayed in a report, a battery health report, a performance report, a utilization report, an energy cost report, etc. The system can also be configured to create automatically a package of information to include with user specified information. The package of information can include data from records and logs used to generate the energy management information from which the user selected information (e.g., energy data logs, waveform logs, device configuration files, etc.), and can optionally include any additional data related to the energy management information from which the user selected information. In one example, the system creates a package based on user selected information in a report, including sensor data logs and/or records used to generate the report. In another example, related information can be captured to augment the information within the user's request for expert advice. In one example, energy costs reports can be packaged with the energy management information use to generate the report, and information associated with the energy cost report can also be captured (e.g., energy load, distribution, wiring architecture diagrams, related sensor data, etc.) to facilitate suggestions by a subject matter advisor.

In some embodiments, the system can also be configured to require user consent prior to submission of the package of information and can also be configured to require payment prior to submission of a user question. In further embodiments, the system includes response subsystems for receiving user requests. Routing of the request to subject matter and/or context experts can occur with the submission of the request and/or upon receipt of the request by the response subsystems. In some embodiments, routing can be distributed with some routing operations executed upon creation and/or submission of a request, and with further routing operations executed upon receipt at the response subsystems.

According to another embodiment, the system and/or the response subsystems can provide status information and/or notifications regarding user requests (e.g., additional information needs, response available, etc.). In one embodiment, the response subsystems deliver responses for user consumption directly in the energy management system used to create the request. Further, the system can be configured to capture such responses and save the responsive information for viewing "in-line." For example, the response can be viewed and/or saved directly within the report the user was viewing when creating the request. In some examples, received responses can include notes, annotations on viewed reports, video recordings, voice recordings, etc., which can be delivered to the user within the context of their request. In additional embodiments, responses to requests can also include power device configurations and/or management configurations designed by the advisors to resolve energy management issues. In further embodiments, responses can include power management goals and/or health check settings to facilitate improved power management.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Example Expert Request System

FIG. 1 illustrates one embodiment of an energy management system 100. The energy management system 100 can be configured to provide energy monitoring, management, and support capabilities to users. The support capabilities can include functions and operations to monitor, manage, and report on energy consumption, energy costs, energy utilization, among other options, and provide reports on the same. Some implementations can be specifically configured to a specific energy environment in which monitoring, management, and/or reporting functions are required (e.g., a data center energy segment, energy health segment, healthcare segment, building management segment, business operation segment, cooling system segment, etc.). The system 100 can be configured to provide static and/or dynamic reporting on any energy characteristics within a managed location (e.g., energy use/consumption/load: at a site, for groups of devices, for specific devices, individual device health reports, site health reports, etc.). The system 100 can be configured to display user interfaces. The user interfaces can be configured to allow a user to navigate any information on energy management and at any desired level of detail.

The commercially available PowerLogic™ monitoring suite of software, associated products, and devices by Schneider Electric provide examples of energy management software and systems available for delivering energy management information and examples of associated reporting. According to some embodiments, commercially available monitoring/management software can be executed on system 100, for example, on energy management subsystem 108, to provide the energy management information that can be selected by a user to generate a request for expert advice and/or request for information.

Additional examples of energy management software and/or devices include Schneider Electric's service and product offerings in: Automation & Control, Building Lifecycle & Energy Services, Critical Power and Cooling Services, Electrical Distribution Services, Electrical Distribution Service, Engineering Services, and Industrial Repair systems. Commonly owned PCT. App. Nos. US12/43543 (published as WO2012/177,871), US12/35181 (published as WO2012/149,138), and US11/65554 contain additional examples of monitored energy management information and examples of associated reports, incorporated by reference herein in their entirety.

According to one embodiment, the system 100 is configured to accept user requests for information or requests for expert advice associated with the displayed energy management information (e.g., energy management information 102). The user can access energy management information from monitoring/management software executed by an advisor engine 104. In one implementation, the system 100 and/or advisor engine 104 includes a management subsystem 108 configured to execute energy monitoring/management software (e.g., PowerLogic™ monitoring suite of software, products, and devices by Schneider Electric). During normal operation of such software, the user navigates through or accesses displays of energy management information. Depending on the environment and the software employed, the user can manage or monitor device operation, groups of devices, entire sites (e.g., data centers, buildings, groups of buildings, etc.), and obtain energy management information on the same.

In one example, the system 100, advisor engine 104, and/or subsystem 108, can be configured to accept user identification of specific information contained in a report shown within an energy management display. The system 100, advisor engine 104, and/or subsystem 108, can, captures the information (e.g., 102) for analysis. According to one embodiment, analysis, for example, by the advisor engine 104 and/or subsystem 108 includes automatic identification of energy management information used to generate the user specified information. The advisor engine 104 and/or subsystem 108 automatically bundles the identified information into a request for expert advice or request for information. In some embodiments, the user defines a question associated with the specified energy management information and the question, user identified information, and the automatically identified underlying data is packaged as a request for expert advice or request for information. The request is then communicated to a response subsystem 110. Subject matter advisors can review the request on the response subsystem 110 and generate a response 106 to the user request. In some examples, the provided response is generated to give the user at least one or more of: an answer to the question, energy optimization suggestions, energy maintenance issues/tasks, new device configurations for resolving an issue, software configurations for resolving an issue, instructions for resolving an issue, etc.

According to some embodiments, the energy management subsystem 108 and/or response subsystem 110 can be configured to route user requests to subject matter advisors based, at least in part, on the user specified information. In one example, the advisor engine 104, and/or subsystems 108-110 capture user context information as part of generating the user request and route the request to an advisor based, at least in part, on the user context (e.g., viewing a battery health report, accessing power device configurations, the software being used, the energy environment being managed, the devices being managed/monitored, etc.). User context can also include information on the user, their role, experience, expertise, function, etc. Thus, support requests can be routed by the advisor engine 104, and/or subsystems 108-110, to advisors based on technological matches as well the advisor's ability to speak the same language as the requesting user.

In one embodiment, potential advisors remotely register with the response subsystem 110 to be expert responders. The response subsystem 110 collects profile information on the expert responders (e.g., role, software familiarity, authored software, authored reports, energy segments, energy environment, energy systems, device expertise, experience, etc.). The collected information is used by the engine 104 and/or subsystems 108-110 to match user requests to responders and route accordingly.

According to some embodiments, responders can log into the response subsystem 110 to answer user requests. The responders can prepare answers to questions, video instructions for resolving issues, annotations to reports, new device settings, new architectures, among other options (e.g., response 106). The advisor engine 104, management subsystem 108, and/or response subsystem 110 can be configured to return generated responses (e.g., 106) to the requesting user within the same context from which the request was generated. In one embodiment, responses are returned to the requesting user in-line within the display from which the user selected energy management information. For example, if the user selected power quality information within a battery health report (e.g., at 202 FIG. 2A—discussed in greater detail below), the generated response can be returned within the same display of the battery health report.

According to another embodiment, system 100 and/or advisor engine 104 can include payment subsystems (not shown), that manage service subscriptions. Service subscriptions can specify whether or not a user is authorized to submit a request, how many requests can be submitted, submitted within a time period, and/or how much a request will cost to submit. In some embodiments, any one or more of the advisor engine 104, energy management subsystem 108, and response subsystem 110 can be configured to manage authorization to submit requests and payment if required and/or elected.

Figure 2A:
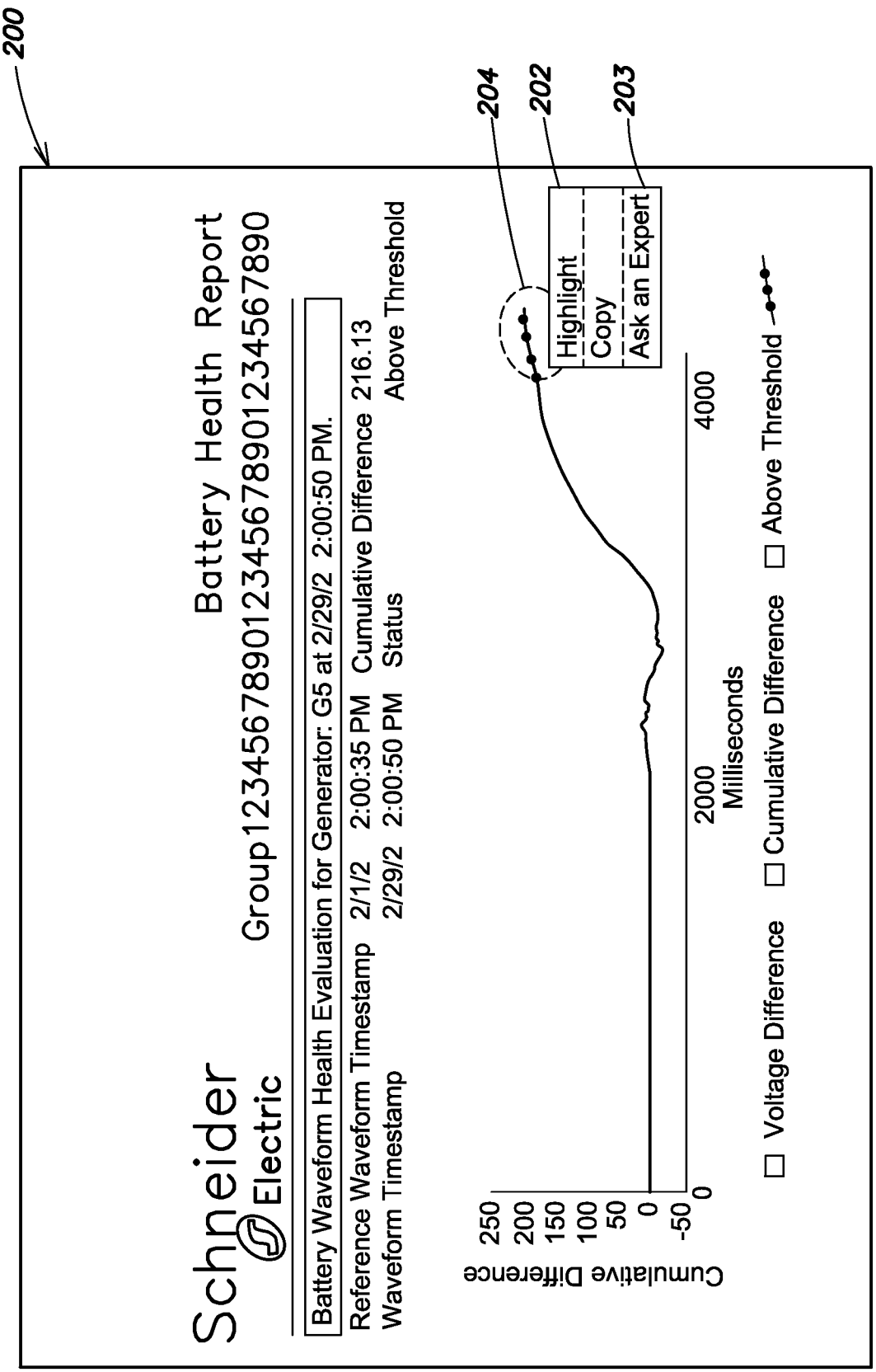
FIG. 2A is an example user interface displaying a battery health report, according to one embodiment.
Figure 2B:
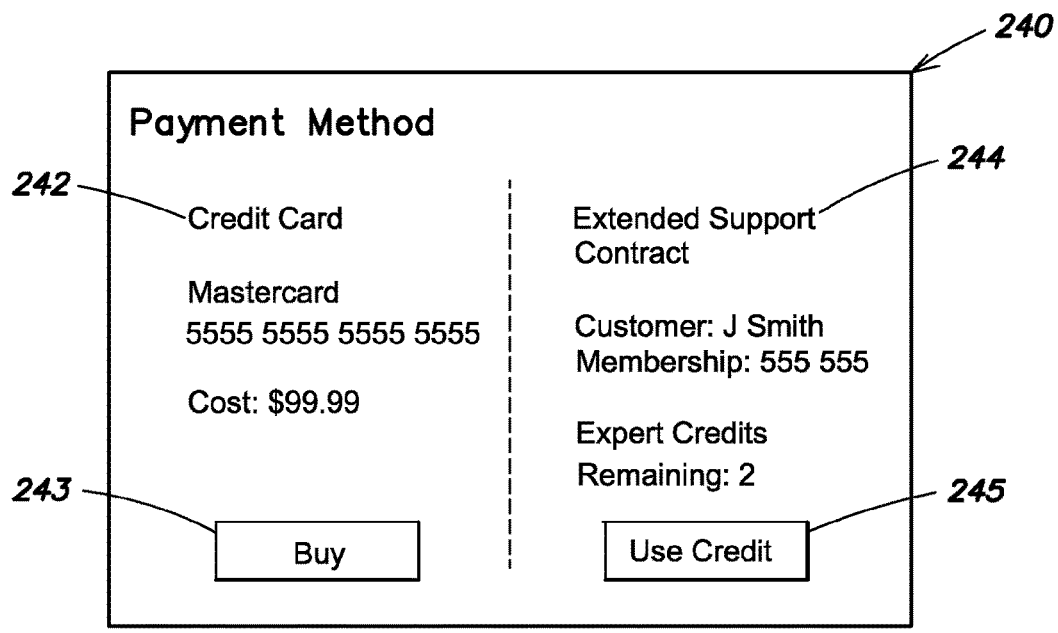
FIG. 2B is an example user interface displaying a payment screen, according to one embodiment.

Shown in FIG. 2B is an example user interface 240 for managing payment information and/or accepting payment selection. User interface 240 can be displayed by the system 100, the advisor engine 104, and/or the UI component 108 responsive to user selection of data to define a request for expert advice, for example, in user interface 200. Shown in FIG. 2A is user interface 200 displaying a "Battery Health Report," including energy management information on a specific device. The user interface 200 can be configured to enable a user to select energy management information within the report. For example, at 204, above threshold readings are highlighted in the display for user review. Responsive to selection (e.g., via mouse click, drag and select operations, right mouse click, etc.) the user interface 200 can be configured to display a menu for generating an "Ask An Expert" request at 202. Selection of 203 in the interface, causes the system (e.g., 100) to perform the functions and operations to generate, submit, and return responses to a request for support or request for information.

According to some embodiments, the functions and operations discussed with respect to system 100, advisor engine 104, energy management subsystem 108, and response subsystem 110 can be implemented through one or more system components specially configured to execute one or more of the functions discussed herein. In some implementations, the system components can be distributed across multiple computer systems, including, for example, subsystems 108-110 and/or computer systems executing the advisor engine 104.

Figure 3:
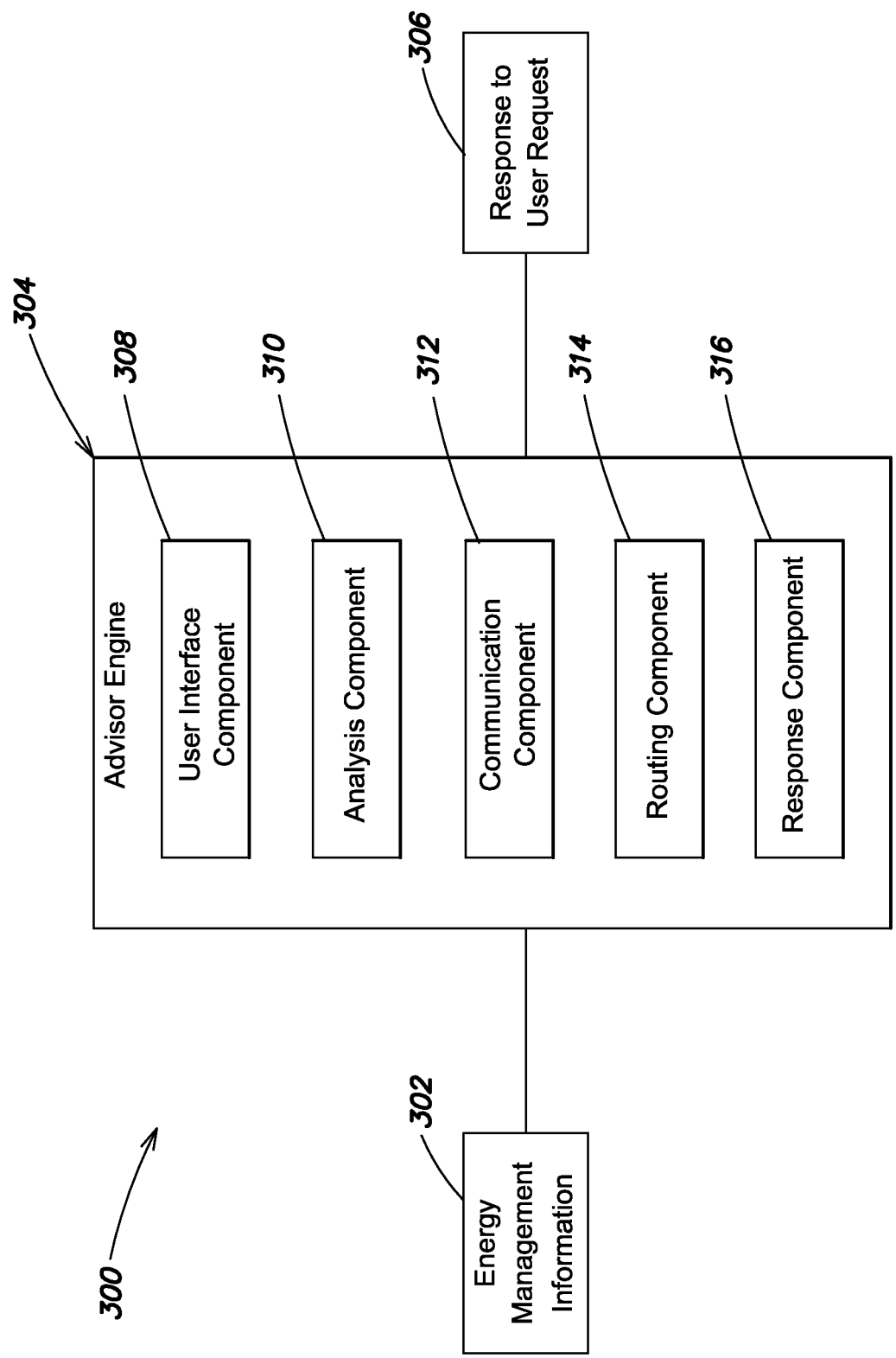
FIG. 3 is a block diagram of an example energy management system, according to one embodiment.

Shown in FIG. 3 is an example energy management system 300 including an advisor engine 304 and system components 308-316. According to one embodiment, the system 300 is configured to accept user requests for information or requests for expert advice associated with the displayed energy management information (e.g., energy management information 302). In one example, the system 300 accepts user identification of specific information contained in a report shown within an energy management display, delivers the information selected from the display (e.g., 302) to an advisor engine 304 to form a user question, which routes the question to a responder, returning any response (e.g. 306) to the requesting user. The system 300 can also accept user specification of energy management information in other system displays, including, alerts, notifications, status checks, among other options, to define the input energy management information 302.

According to some embodiments, the system 300 can be configured to allow selection of specific sections of a display, ranges of data in the display, specific events shown, highlighted information, etc., to establish input 302. According to one embodiment, the system 300 uses the specified information to create the request for information or a request for support by automatically capturing information to include with the request. In one example, the request for information can include a question to be answered on the specified information. In some embodiments, the system automatically identifies additional information (e.g., data logs, data reports, related reports, related logs, etc.) to include with the request based on the user's selection. In one embodiment, the system 300 can limit the identified information to specific time periods associated with the set of user selected data. For example, the system can use pre-defined time values to capture additional data occurring before and after the user selected data. In some examples, having preceding and subsequent data can allow an advisor to more accurately assess the request. In some implementations, automatically identifying and including the preceding and subsequent data facilitates generation of request for information while limiting the data needed to be submitted with the request.

According to another embodiment, the system is configured to route the requests for information to subject matter, expert, and/or energy segment advisors. Appropriate routing of requests can facilitate not only correct responses, but also responses tailored to the user's context in which the request was generated. Further, routing of requests can be tailored by the system to the user's level of experience and/or expertise as well. In some embodiments, the energy management system 300 includes an advisor engine 304 configured to enable the user to select specific energy management information displayed by the energy management system. The advisor engine 304 can be configured to route requests for information to response subsystems, receive and manage responses to the requests or provide requests for additional information to resolve the request for information.

Elements of the system 300 and/or advisor engine 304 can be provided using a computing system such as the computer system 700 and/or 702 described with reference to FIG. 7. For example, the advisor engine 304 can be executed on the computer system 700 and/or 702 to provide the functions and operations discussed herein. In other embodiments, the advisor engine 304 can include additional components executed on the computer system to perform specific operations. The advisor engine 304 can instantiate software components executed on one or more processors, as discussed below, or can include hardware/software components for performing the functions and operations discussed herein. In some implementations, the system 300 and/or advisor engine 304 can be configured to communicate and/or integrate with existing energy management systems and/or energy support systems to provide responses to user requests for information.

As shown in FIG. 3, the advisor engine 304 receives energy management information as an input 302. The energy management input 302 can include any energy management information, and in some examples, any energy management information displayed in an energy management report (e.g., health information, maintenance information, event reporting, energy waveforms, energy consumption information, energy device settings, etc.). According to one embodiment, a user selection specifies energy information that is communicated to the advisor engine 304 as the input 302.

In some implementations, the advisor engine 304 can be configured to display user interfaces ("UIs") to the user. The UIs can be configured to allow the user to select specific energy information provided as input 302 and to return responsive information 306 to the user. Typically, the responsive information 306 includes any answers, if known, to the user's request, and can also include recommendations for optimizing any one or more: of energy consumption, energy balancing, energy health checks, load optimization, etc. According to one embodiment, the user interface displays can produce reports on energy management information (e.g., FIG. 2A "Battery Health Report"). The system and/or advisor engine 304 can be configured to provide user interface tools within a displayed report or other display of energy management information. In one example, the user interface tools can be displayed in conjunction with the reports and/or integrated within displays of energy management information contained in the reports.

According to one embodiment, a UI component 308 can be executed by the advisor engine 304 and/or system 300 to enable the user to enter a selection of energy management data. The UI component 308 can be configured to generate and display the user interface tools for selecting energy management information. The user interface tools can be visually selected within a display (e.g., with a mouse, pointing device, or touch screen) and/or can include text entry fields for specifying energy management data on which to request support or information. According to one embodiment, the user can access the UI tools via menus provided in UI displays, or by right clinking within a display of energy management information. In further embodiments, drag selection (i.e., depressing a mouse button and dragging the mouse pointer across a visual display) of a visual display of energy management information triggers the UI component 308 to display the UI tools. The user can then select an option to create a request for expert advice or request for information based on the selected energy management information.

In some implementations, the UI component 308 can be integrated into existing energy management systems and/or software. In further implementations, the UI component 308 can be configured to communicate with existing energy management systems to enable user selection of energy management information (e.g., within displayed reports).

According to some embodiments, a user can interact with displayed energy management information through execution of the UI component 308 on the system. Interacting with the UI component 308 the user selects energy management content and can define an associated question. In one example, the user can select any one or more of a PQ event, totals displayed in an energy report, and select points within an energy waveform display. (e.g., FIG. 2A). The UI component 308 can be configured to capture the user's current context in conjunction with the user defined energy management information. For example, the user context can include what report and/or data was being reviewed by the user. (e.g., PQ events, Battery Health Report, waveform data, energy consumptions summary, energy load displays, power graphs, power diagrams, wiring diagrams, etc.). In some examples, the system captures user context based upon the report and/or data being viewed, the energy management software being used, the device being accessed, a software version for the device and/or management program, data underlying the user's selection, display language, environment, manage architecture of devices, device environment, etc.

In other examples, user context can also include associated energy segments. Energy segments can include classifications of specific tailored energy management implementations. For example, data center energy management systems can include functionality different or enhanced over commercial building energy management implementations. Information on the energy management implementation can be collected by the UI component 308 as part of creation of a request for information or request for expert advice.

According to other embodiments, the advisory engine 304 can also include an analysis component 310. The analysis component 310 can be configured to identify a user context for a request based on the information selected through the UI component 308. According to one embodiment, the analysis component 310 can be responsible for determining user context, identifying data associated with a user request, automatically collecting user context and associated information into a package to include with a request for a subject matter expert or request for information. In some embodiments, the analysis component 310 can evaluate data selected by the user and communicated from the UI component 310, to provide suggestions on questions to ask (e.g., "What does this PQ event mean?"; "How do I resolve this event?"; "How do I improve this value?"; "What do these events signify?"; "Why is this portion highlighted?"; "What is this report?"; and "What does this report mean?"; among other options).

According to other embodiments, the analysis component 310 is configured to capture user context information for inclusion with a request. The user context information can include specification of an energy segment associated with the energy management data subject to the request. Energy segment associations can include market specific energy segments (e.g., healthcare, building management, data center, automation, environment control, etc.). Energy segment associations can also include an energy management system's specific branding and/or energy management functionality provided (e.g., energy management software can be branded to specific energy environments targeted to Power Management for Data Centers and/or specific sets of monitoring, management, and other functionality). In other examples, energy segment associations can be specified by an energy management software version, name, identifier, package, etc.

According to other embodiments, the analysis component 310 is configured to capture user context information, which can include context information specific to the user that created a request for a subject matter expert. For example, the analysis component 310 can be configured to capture user profile information. The user profile information can include any one or more of a current position, information on technical experience, historical requests by the user, user role (e.g., facility manager, energy manager, C.F.O., IT Staff, etc.), among other options. The user profile information can be included as part of the definition of the user's context to include with a request for a subject matter expert or request for information.

In some embodiments, the analysis component 310 can also collect additional information on user context in conjunction with or instead of the UI component 308. The analysis component 310 can analyze mappings between specific reports accessed by a user, specific energy environments, energy management information, user selected data etc., to determine what information is included as user context. In one example, the user select energy management data within a PQ report. The PQ report can include mappings to specific data logs (e.g., used to generate the PQ report) and power waveform logs. The analysis component 310 can be configured to associate automatically the mapped data with a user request for information made within the PQ report. In some embodiments, the PQ report can also be mapped to device configuration files and any one or more of the logs, waveforms, and device configuration files can be included with the user's request for support. According to some embodiments, energy management information can be mapped to the logs, data records, devices, and/or device configurations from which the energy management information is generated. The analysis component 310 can capture the mapped information and associate the mapped information to user questions or requests for information. In some embodiments, the analysis component 310 can limit the information captured and associated with a user request. For example, the user selected data can be associated with a time or time period. The system 300 and/or the analysis component 310 can filter the mapped information based on time periods within a predetermined length of time from the time or time period associated with the user specified information.

In other embodiments, the analysis component 310 can be configured to query energy management software to determine associated information without explicit mappings. In further embodiments, the analysis component 310 can analyze a viewed report to determine what information is being displayed and to capture information used to generate the report. In some implementations, the analysis component 310 can be configured to analyze energy management information being displayed on a user interface to determine user context and information to automatically associate with a request.

According to one embodiment, the analysis component 310 can optionally be configured for managing user submission of requests for subject matter experts or requests for information. Management by the analysis component 310 can include verifying authorization to submit a request. For example, the system 300 can require a support contract in order to submit and receive responses to user requests. The analysis component 310 can be configured to maintain information on support terms (e.g., number of requests per time period) and validate that the user is authorized to submit a request, for example, based on the support contract.

In addition, the system can also provide functionality to pay for a request for a subject matter expert and/or purchase a number of requests. In one example, the analysis component 310 can be configured to manage payment terms, accept payments, and authorized users to submit requests responsive to payment.

According to one embodiment, the system 300 can determine authorization and/or required payment prior to allowing the user to generate a request for a subject matter expert or request for information. In other embodiments, the system 300 can determine authorization once a request has been defined and user elects to submit the request. Shown in FIG. 2B is an example user interface 240. User interface can be displayed by the system to capture payment information and/or authorization to charge a user for a request. At 242, payment information (e.g., payment account, credit card data, etc.) can be displayed along with a cost for submitting the request. At 243, the user interface displays a purchase option, configured to accept user selection and charge a respective payment account responsive to selection. According to some embodiments, at 244 shown is any associated support contract information for the requesting user. The user interface can be configured to enable a user to select between using support credits (e.g., at 245) and submitting payment (e.g., at 243) for respective requests. In further examples, the user interface can be configured to acknowledge a support contract and terms (e.g., unlimited requests) as part of generating a user question or request for information.

As discussed, the system 300 can create a package of information to include with the user specified information.

Figure 2C:
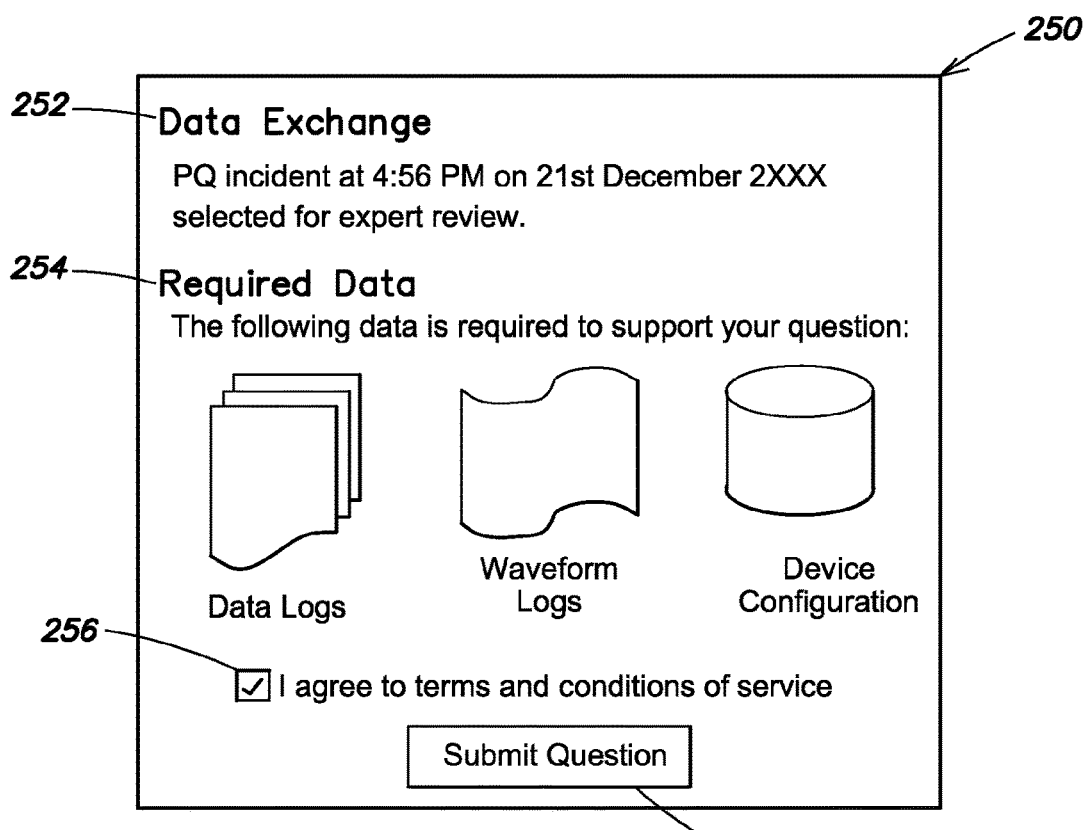
FIG. 2C is an example user interface displaying a consent screen, according to one embodiment.

The system can reference automatically logs and data records underlying any energy management information being displayed to the user to generate the package of information. The system 300 and/or the analysis component 310 can also limit the captured meta-data to associate with the user's selection based on a time or time period associated with the user specified information. The system 300 can filter the logs and data records to time periods preceding and following a time or time period associated with the user selected information. Once the user selected information and the associated information is identified, the analysis component 310 can be configured to request explicitly the user's consent prior to including the additional information. In some examples, the system 300 can also display the additional information identified for inclusion as part of requesting user consent. The user may provide consent in a user interface display (e.g., generated by UI component 308) and submit their request. In one example, the user interface display is configured to allow consent for each data item (e.g., each file, log, configuration, etc.), and in others the user interface provides one selection for consent. Shown in FIG. 2C is an example user interface 350 for displaying a generated user request and associated information. The user interface 350 can include a summary of the information that will be provided and/or context information (e.g., at 352 "PQ Incident at 4:56 . . . ") associated with the user request. Any required data associated with the request can be displayed in the user interface at 354 (e.g., data associated with the request as determined by the analysis component 310). In some examples, the required data can include data logs, waveform logs, and/or device configurations. The user interface can require an affirmative act by the user to accept terms and conditions of submitting a user request. For example, the user interface can include a check box 356 that must be selected in order to proceed. Once selected the user interface can be configured to accept the user's explicit consent responsive to selection of 358 "Submit Question." Once consent is received, the user's request can be submitted.

Upon submission, the system can route the user's request based on any combination of user selected information, type of content selected, context of the selection, energy segment (e.g., battery health report routes to energy health segment advisors, data center content routes to data center segment advisors, energy trends routes to an energy efficiency expert, power quality incident routes to an electrical engineer, etc.). According to one embodiment, the system 300 can be configured to route automatically the request for information to subject matter advisors. In some embodiments, routing by the system 300 can be based on the energy management information selected in the user interface. For example, responsive to user selection of PQ data within a display of the PQ report, the system can be configured to identify the context of the request for information and route the request to an expert on PQ problems. Routing can be determined by the system 300 based on any one or more of context of the request, content selected by user, information on the requesting user, environment information, application information, among other options.

According to one embodiment, the system 300 can include a routing component 312 configured to analyze a request and any associated information (e.g., user context, data logs, energy waveforms, device configurations, user information, etc.) to determine a match to a responder best suited to analyze and response to the user's request. The system and/or routing component 312 can match subject matter experts to a user's request based on the user's context. Further, the routing component 312 can match responders to the user's request based on the user's profile. Shown in Table 1 are examples of metadata fields and example values describing user context associated with a user's request.

TABLE 1

| Category | Name | Example Values |
|---|---|---|
| Platform | Name | Power Monitoring\|Control |
| Platform | Language | English\|Chinese\|French\|etc. |
| Platform | Platform Segment Edition | Data Center Healthcare Building |
| Platform | System Size | Device Count\|Tag Count\|SMP Count |
| Platform | Device Types | List of device types present in system/site/group |
| Context | Content Type | Report\|Diagram\|Gadget\|Performance Indicator\| . . . |
| Context | Content Author | Platform\|Data Center Segment\|e-Solutions\| . . . |
| Context | Content Name | Energy Cost Report\|Battery Health Report\|Utilization Report\|Load Report\|Distribution Diagram\|Wiring Diagram\| . . . |
| User | Name | Xxxx xxxx |
| User | Role | Business manager\|system architect\|engineer\|developer\|site planner\|management\| . . . |

According to one embodiment, the routing component 312 can be configured to match the context metadata (e.g., shown in Table 1) to responders who can evaluate and prepare responses to the user's request. In some implementations, the routing component 312 matches responders to the subject matter of the request. In other implementations, the routing component 312 is configured to match responders to user profile information (e.g., user role) such that the response conforms to, for example, the user's technical experience, understanding, and/or nomenclature.

In one example, the routing component 312 can be configured to register responder information to provide matching data. Responders may access the system 300 and/or routing component 312 over a communication network to provide their registration information (e.g., language, experience, expertise, name, etc.). Table 2 includes example registration information for a potential responder (discussed in greater detail below).

According to some embodiments, matches between user context and responder information can be weighted and/or prioritized. In one example, platform segment matches (i.e., matches to the power management software, software version, managed environment (e.g., health care, data center, automation control, environmental control, etc.)) are prioritized over other criteria. Based on platform segment priority, user requests are routed to matching segment responders first, and can optionally be further routed within matching segment responders based on remaining metadata. Other matching priorities can be used in conjunction with segment priority, including for example, content author matches. In some examples, the programmer or content author of a report displayed by an energy management system is available to answer user questions or request for information. Matches to the specific content author can be given the highest priority by the system and route any matching accordingly. In further embodiments, content author matches are used by the system in conjunction with segment matches to route the user requests to responders. Additionally, the system 300 and/or routing component 312 can determined a best overall match based on available match criteria and route the request to the best matched responder. In some implementations, the advisor engine 304 and/or routing component 312 can include multiple routing approaches. Administrative settings may specify a particular routing algorithm. Additionally, multiple routing algorithms can be evaluated and a best match can be determined on a confidence level associated with respective matches.

According to some embodiments, matched requests can be delivered to response queues by a communication component 314. For example, the routing component 312 can determine any one or more of a best match, matched segment, matched content author, and pass the matching information to a communication component 314 for delivery. The communication component 314 can be configured to deliver users' requests directly to individual responders and/or response queues. In some examples, the response queues can be configured for remote access by individual responders and/or communicate response requests to individual responders contact information (e.g., e-mail addresses, phone, etc.). The communication component 314 and/or routing component 312 can also be configured to monitor load and response times associated with the response queues. In one example, the routing component 312 can dynamically adjust routing of requests based on load and/or expected response time. In further embodiments, the communication component 314 can be configured to dynamically adjust routing of requests based on load and/or response time.

According to some embodiments, routing of requests to responders directly facilitates scalability of the energy management system. According to one embodiment, the system can handle a multiplicity of requests received from a large end user population and direct such requests to a small population of responders, including, for example, subject matter experts.

In some implementations, the communication component 314 is configured to manage communication between end user systems and support systems. The communication component 314 can also be configured to manage communication between system components and within the system components. For example, the communication component 314 can manage communication of a user question generated at a user system (e.g., using UI component 308), including additional information (e.g., identified by the analysis component 310), according to a matched responder (e.g., identified by the routing component 312), to response subsystems (e.g., managed by a response component 316). In one embodiment, the communication component 314 can then return completed responses to the user request. In some examples, a responder may request and received additional information from the user through the communication component 314.

According to some embodiments, the system 300 and/or advisor engine 304 can include a response component 316 that manages and/or includes response subsystems. The response component 316 can be configured to define and manage response queues, manage registration of responders, capture responder profile information, and manage notifications to responders, among other options. The response component 316 can be configured to provide status information on user questions or requests for information. For example, the response component 316 can save and update status information on each received request. Example statuses can include, request received, additional data required, under analysis, response generated, and response available. In some embodiments, the response component 316 can be configured to update a status associated with a request during processing of the request. The response component

316 can be configured to provide status information to end users, for example, through the communication component 314.

According to one embodiment, once a user generated request is received, the advisor engine 304 and/or the response component can be configured to notify responders assigned to answer the user question. Depending on routing of the request, responders can be individually assigned and notified, or one or more responders assigned to a response queue can receive a notification of an outstanding request.

According to another embodiment, the response component 316 can be configured to maintain information on available responders. In one example, responders access the response component 316 via a computer network (e.g., the Internet). If a responder has not been interacted with the response component 316 previously or the responder's profile information is missing or incomplete, the response component 316 can be configured to execute a registration process to capture responder information. In some embodiments, the response component 316 collects information on, for example, a responders experience, expertise, and role. The information collected can also include information on specific software the responder has experience with, any reports authored by the responder within various programs (e.g., authored or programmed portions of the battery health report template subject to the user's request (see e.g., FIG. 3)), communication language(s), etc.

Show in Table 2 is an example responder profile and organization of responder profile information.

TABLE 2

| Category | Name | Example Values |
| --- | --- | --- |
| Platform | Name | Power Monitoring |
| Platform | Language | English |
| Platform | Platform Segment Edition | Healthcare |
| Expert | Content Type(s) | Report |
| Expert | Content Author | Healthcare Segment |
| Expert | Content Name(s) | Battery Health Report |
| Expert | Role | Domain Expert |
| Expert | Name | Markus Xxxxxx |

Table 2 illustrates an example of one data record and one data record format. Other records and other formats can be implemented in other examples. Additionally, in some implementations individual responders can have multiple profile records. The multiple profile records can specify profile information within respective energy segments, for respective platforms, respective software, respective response queues, etc. In other embodiments, each responder profile can include all of the information associated with a responder's experience, expertise, role, etc.

As discussed, the response component 316 can be configured to maintain information on available responders. In one embodiment, the response component can be configured to maintain information on connected responders (i.e., the "online" responders who have logged in with the system 300 or through the response component 316). In one example, profile information associated with connected responders can be supplied to the routing component 314, such that matches and routing information are derived based on available responders. In another example, the response component 316 can also be configured to perform routing operations based on available responders instead of or in addition to routing by the routing component 314.

Once the user's question or the user's request for information is received by the responder, the response component can update the request status, for example, to analyzing. As a result of the routing of the requests, the respective responder is the person best suited to address the request and to deliver responsive information in a way that the user requesting help can readily understand. The responder can analyze the user's request, and the package of information that accompanies the request (e.g., energy data logs, waveform logs, device configuration files, device architecture information, etc.). In some examples, the responder may need additional information. The response component 316 can be configured to manage data exchange between the user and the responder to capture all necessary information. In one example, the response component 316 manages such data exchange through the communication component 312 and the UI component 308. In other embodiment, different communication paths can be used. For example, a user request can include direct contact information for facilitating additional data exchange when required.

In other example, the information automatically captured by the system and/or advisor engine 304 is sufficient for the responder to address a user question. The responder can generate a response to the user's question, and the response component 316 can be configured to deliver the response directly to the user system and/or device that initiated the request. In some embodiments, the response component 316 can be configured to pass the generated response to the communication component 312, which can be accessed by the user at their device and/or respective computer through operation of the UI component 308. The response can include a variety of information to enable the user to resolve their issues and/or answer user questions. In one example, textual information can be presented to the user answering a given questions. In another example, the responder can generated textual responses and/or annotation on the report from which the user first generated their request. In yet other examples, the responder can provide information through video and/or voice instructions for display at the user's computer system.

The response component 316 can also be configured to generate new software configuration files, that the user can execute and/or apply to their energy management environment. The configuration files can be targeted to specific devices, groups of devices, and can target managed sites, monitoring settings, environment controls, among other options. Some energy management systems can be extended to provide additional functionality, for example, through executables provided in response to user requests. In one example, software based extensions can be downloaded and executed to provide tailored or extended functionality within an energy management platform. Some executable extensions are referred to as "gadgets" which can be installed initially or downloaded, but may need to be activated by a user prior to their operation. In addition to providing device configurations, the responder can prepare responses that are executable to install and/or activate such gadgets. In some embodiments, the additional functionality can provide further information related to energy management events.

As discussed, generated responses (e.g., 306) can be delivered "in-line" to the end users. In-line refers to the ability of the user to access responses to their requests within the content window or user interface display they were viewing when creating their request. By viewing in-line, the response can provide instruction in the context of the report, data, waveform, etc., from which the request was generated.

By providing the response in-line the system 300 and/or advisor engine 304 facilitates user understanding of responsive information.

Additionally, the response can be prepared using the visualized information as a starting point for instructions to the user on how to resolve their issue. In some embodiments, the responses are saved within and accessible from the report, graph, diagram, and/or performance indicator where the user generated a request. In some examples, a visual indicator can be displayed in conjunction with any report, graph, diagram, gadget, and/or performance indicator to highlight available response information. The visual indicator can be executable to access prior question and responses facilitating access to any response content. In further examples, visual indicators of response information can be displayed for a period of time (e.g., one week, month, quarter, etc.) after which the visual indicator is no longer displayed by the system.

According to some embodiments, in addition to preparing responses to user questions and/or information requests, responders can analyze provided energy management information to establish energy management goals at a user site. In some examples, the responder(s) can model the customer environment using the response component 316. The customer environment model can be used to test new device configurations, generate new wiring architectures, connection schemes, load distributions, etc., to achieve greater energy efficiency. In some examples, the responder can use environment models to identify facility maintenance tasks that are associated with improving energy efficiency. The responder can generate instructions and goals for end users that energy efficiency targets. In some examples, the energy management software at a user site can be configured to accept such goal based requirements and regularly display progress towards a responder generate goal. In other embodiments, the responder can generate a "gadget" or an executable that causes the user's energy management software to provide progress information towards an assigned goal.

Similarly, the responder can create maintenance tasks associated with a user environment. The maintenance tasks can be presented as "to do" lists within energy management displays presented to the user. Compliance with the energy management tasks can be maintain and reported to the user. In some embodiments, information on projected energy savings and/or efficiency can be provided in conjunction with the maintenance tasks to further incentivize the user to perform the maintenance tasks.

In further embodiments, the energy management system can prompt users to deliver energy management information (e.g., data logs, waveforms, configurations, etc.) to support systems for a health check or routine evaluation. Instead of the customer identifying specific information within energy management displays, the system can identify energy management information within an energy environment that can be analyzed to provide a system/site wide status check. The user's site and energy management information can be audited by automatically generating and submitting requests for subject matter experts periodically, on a schedule, or randomly selected times. In some embodiments, consent for "health check" submissions is still required, and the system can be configured to prompt the user for consent at generation and/or submission of each health check.

Figure 4:
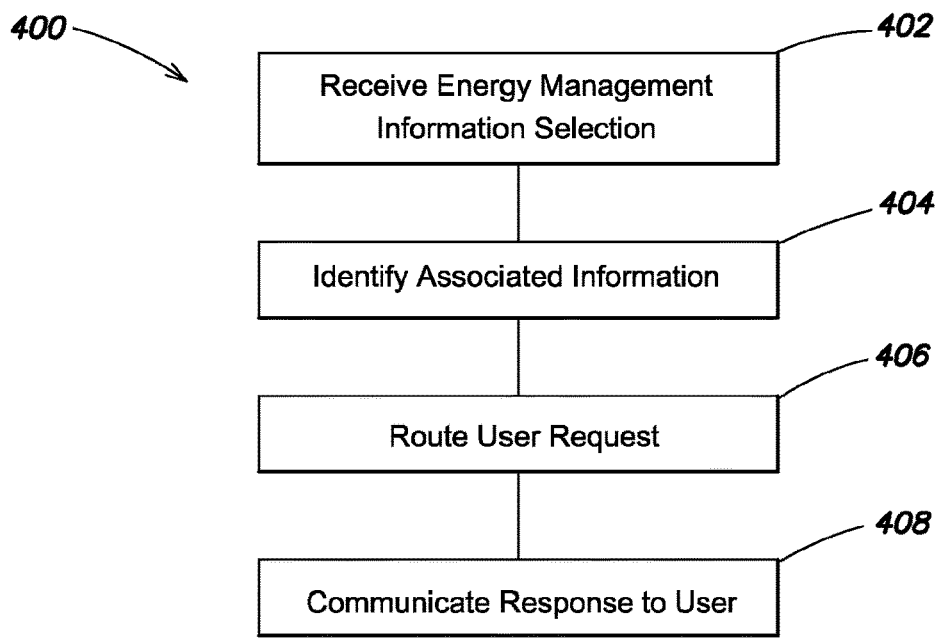
FIG. 4 is an example process for generating, routing, and responding to a user request, according to one embodiment.

As discussed, an advisor engine and/or energy management system can be configured to execute a variety of processes to implement generation, routing, and return of responses to user's questions. FIG. 4 illustrates an example process flow 400 for accepting, routing, and responding to user's questions. The process 400 begins at 402 with receipt of energy management information. According to some embodiments, energy management information can be delivered to user through energy administration systems and/or devices (e.g., Schneider Electric's PowerLogic™ administration suite of products and services). At 402, the user can specify subsets of the energy management information on which the user wishes to ask a question, receive advice, or get additional feedback, among other options. In one example, the user can visually select energy management information in a displayed report (e.g., FIG. 2A—"Battery Health Report").

Responsive to the user's selection, process 400 continues at 404 with identification of associated information. Associated information can include the data, logs, and/or configurations that gave rise to the report the user was viewing when creating their request. According to some embodiments, the associated information is defined to include all the information an expert responder would need to answer a user's question. When additional information is needed beyond what is automatically identified, process 400 can optionally include additional acts to request and received additional data from a requesting user. In some embodiments, a user is asked to consent to delivering the additional information as part of 404.

In some examples, associated information can be automatically determined based on the energy management information selected. For example, selections of waveform data in the Battery Health Report of FIG. 2A (e.g., at 202), require the waveform data, logs, and device configurations so that a responder has the necessary information to address the user request. Identification of associated information at 404 can also include capture of user context information. In one example, user context information includes any one or more of: data on what report the user was viewing, the device and/or devices to which the report pertains, the software being used to manage the devices, any specific energy environment information for the location, any specific energy environment information the software is tailored to manage (e.g., energy segments on healthcare, data center, building management, etc.). User context information can also include information on the user requesting support (e.g., role, responsibilities, experience, expertise, etc.)

At 406, the user request is routed according to the user context provided with the request. In some embodiments, routing at 406 includes identification of a subject matter expert matching the context of the request. Matching can be determined using a variety of algorithms. According to some embodiments, the matching algorithms are configured to insure that the subject matter expert has expertise on the subject matter (e.g., report, data logs, waveform data, energy environment, monitoring software, monitoring software version, etc.) and optionally the ability to communicate effectively with the requesting user. For example, matching can occur on technical expertise, and also, on information about the user, so an engineer can correspond with an engineer subject matter expert, while a business manager can speak to a planning subject matter expert. In some examples, routing at 406 can enable users and responders to speak the same language when asking and answering users' questions.

Once requests are routed to the appropriate expert at 406, the expert responder prepares an answer to the request. At 408, the response is returned to the requesting user. In some embodiments, the response is returned to the user in-line. For example, the user receives a notification and/or visual indication in the Battery Health Report (e.g., FIG. 2A) that responsive information is available. Thus, the user may select the notification and/or visual indication in the Battery Health Report to access the response in the same interface from which the user generated the request. In some embodiments, the response can include text, video, gadgets, diagrams, annotation, etc. All of which may be accessed directly in the report on which the user asked their question. Additionally, the user can save responses in the same report for subsequent access.

Figure 5:
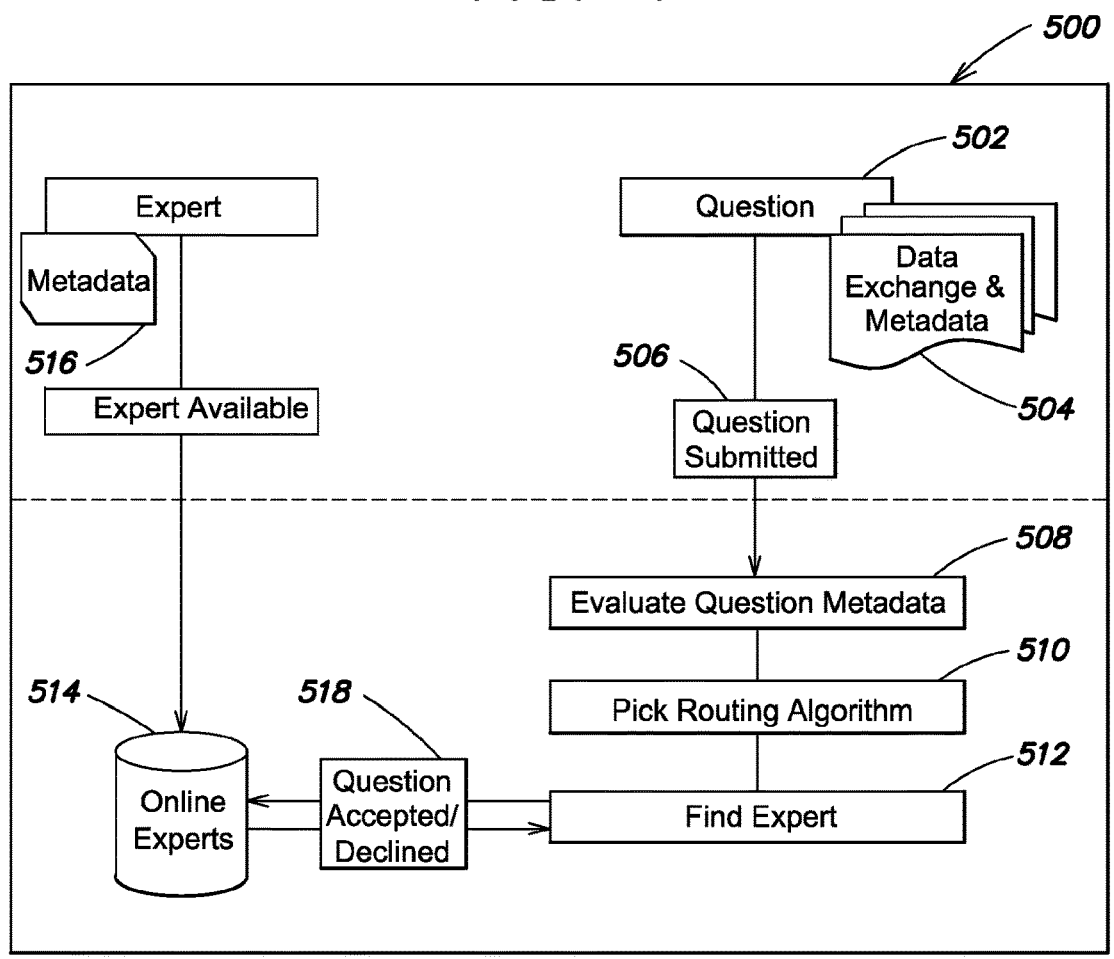
FIG. 5 is a flow diagram illustrating a process for routing a user request for information.

As discussed, routing of user's questions or requests for information (e.g., 406) can include multiple algorithms for routing requests to subject matter or expert responders. Shown in FIG. 5 is an example process flow 500 for routing user requests to subject matter/expert responders. The process 500 begins with generation of a user's question. For example, a user question is specified at 502 with the specifics regarding data exchange and metadata (e.g., associated information and user context) specified at 504. At 506, the question and a package of information (e.g., associated information and user context) is submitted. According to some embodiments, the submitted question is received by a response component or response subsystem (e.g., 316 or 110). At 508, metadata associated with the question is evaluated against a selected routing algorithm. In some embodiments, the routing algorithm can be selected from a plurality of routing algorithms, for example, at 510. In other embodiments, a specific routing algorithm can be pre-selected, and act 510 is executed by using the pre-selected routing algorithm. As discussed above, various criteria can be used to select and expert or the responder at 512, based for example on the routing algorithm of 510. In one example, the energy environment in which the user is operating received the highest priority, and responders are identified at 512 based on matching experience and/or expertise with the user's energy environment. The user's energy environment can be defined from user context information based on, for example, the energy segment in which the user is operating (e.g., healthcare, building management, automation control, environmental control, etc.), the software being used to manage the environment, and/or a specific version of the software being used, etc.

In another example, compatibility between the request user and responding expert can be prioritized. As discussed above, such compatibility can be determined by the system (e.g., at 512) from user context information based on a match between the user's profile information the responder's experience, expertise, etc. Other examples can include a best match algorithm that includes both environment and compatibility determinations to find an expert at 512.

Finding an expert can also include determining availability though a record of online experts (e.g., stored in repository 514). A repository of available experts can be interrogated as part of execution of 512. Expert metadata (e.g., 516) can specify information about the potential responders (e.g., role, responsibility, language proficiency, experience, expertise, authored reports, energy management software experience, energy management device experience, etc.) as well current and/or future availability. According to some embodiments, matching of experts at 512 can be made only against available experts. Although in other embodiments, requests can be also queued to an unavailable expert for later response. Process 500, continues at 518 with accepting, declining, and/or requesting additional information for a user's question. According to some embodiments, accepted questions are then responded to by the matched expert, declined questions are returned to the requesting user, and requests for additional information are returned to the user for routing back the responder identified at 512. In some examples, submissions by the user following a request for additional information can be matched to another responder (with preference given to returning to the same responder) to insure availability.

Process 500 illustrates one example routing flow, in other embodiments, various steps illustrated can be executed in different order or can be consolidated into fewer steps. In yet other embodiments, some steps can be omitted. According to some embodiments, process 500 and/or portions of process 500 can also be executed by other processes (e.g., 400) and/or executed by system elements described herein.

Figure 6:
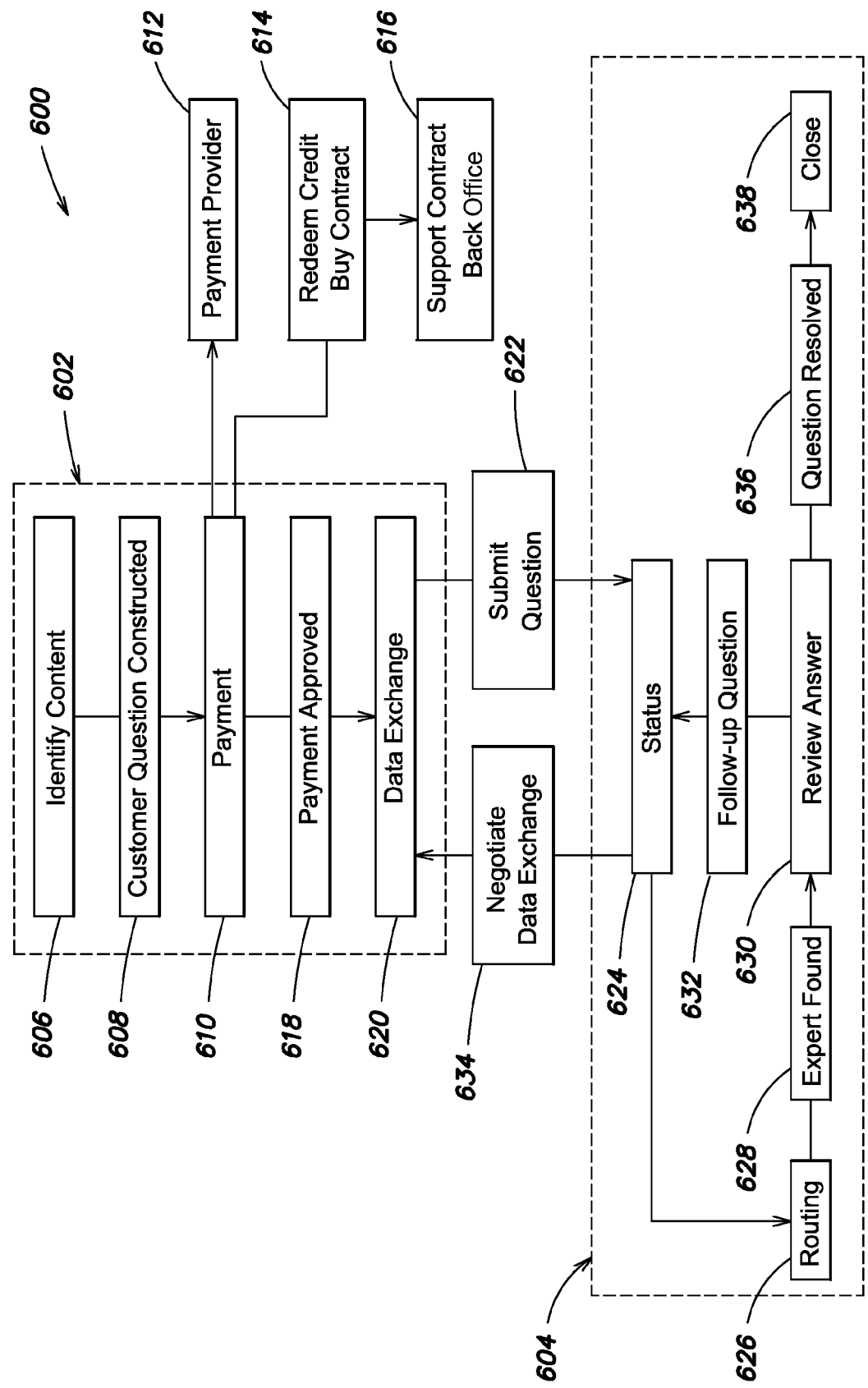
FIG. 6 is a flow diagram illustrating a process and system components for responding to a user question.

Shown in FIG. 6, is another process flow 600 that can be executed by an energy management system (e.g., 100 and/or 300) to generate, route, and response to user requests. In some example, functions described with respect to process 500 can be executed as part of and/or in conjunction with process 600. The process flow 600 also illustrate various subsystems on which various steps can be executed, according to one embodiment. Shown at 602 is an energy management subsystem (which can include, e.g., 108) and a response subsystem 604 (which can include, e.g., 110). According to one embodiment, within the confines of the energy management subsystem 602, a user is able to identify content at 606 and create a question to ask at 608 packaged with information associated with the identified content. Optionally, payment can be made at 610, if necessary. Payment at 610 can include communication with a payment provider 612 through a payment account or via support credits at 614. The support credits can be from an existing support contract or a newly purchased support contract (e.g., 616).

Process 600 continues at 618 with approval of a selected payment method. Once payment is approved, data exchange occurs at 620, with delivery of the user's content, question, and any associated information. According to some embodiments, data exchange at 620 can include explicit consent by the submitting user via a submit operation at 622. Once received, status information associated with the request can be updated at 624. For example, the response subsystem 604 can be configured to generated and provide status information associated with each request. Routing operations can then be performed 626 (including, for example, process 500) on the user's submission. Once an expert is found 628, the request is delivered to the expert responder to review and/or generate a response at 630. Upon review, the responder may determine that additional information is required to response to the user request. Follow up questions and requests for additional information can be generated at 632 and delivered to the user as part of negotiating additional data exchange 634. If the current information is sufficient and/or the user has responded with additional data (e.g., through re-execution of 620-624), the expert responder can generate communicate the answer at 630. Once a response has been communicated, the status of the question can be updated to "resolved" at 636 and the user request can be closed at 638. According to some embodiments, the response can be communicated to the user in-line so that the user never needs to access any other computer systems or software other than that provided by the energy management subsystem 602.

Process flow 600 illustrates one example routing flow, in other embodiments, various steps illustrated can be executed in different order or can be consolidated into fewer steps. In yet other embodiments, some steps can be omitted. According to some embodiments, process 600 and/or portions of process 600 can also be executed by or as part of other processes (e.g., 400) and/or executed by the system elements described herein.

Example Computer System

As discussed above with regard to FIG. 1 and FIG. 3, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 7:
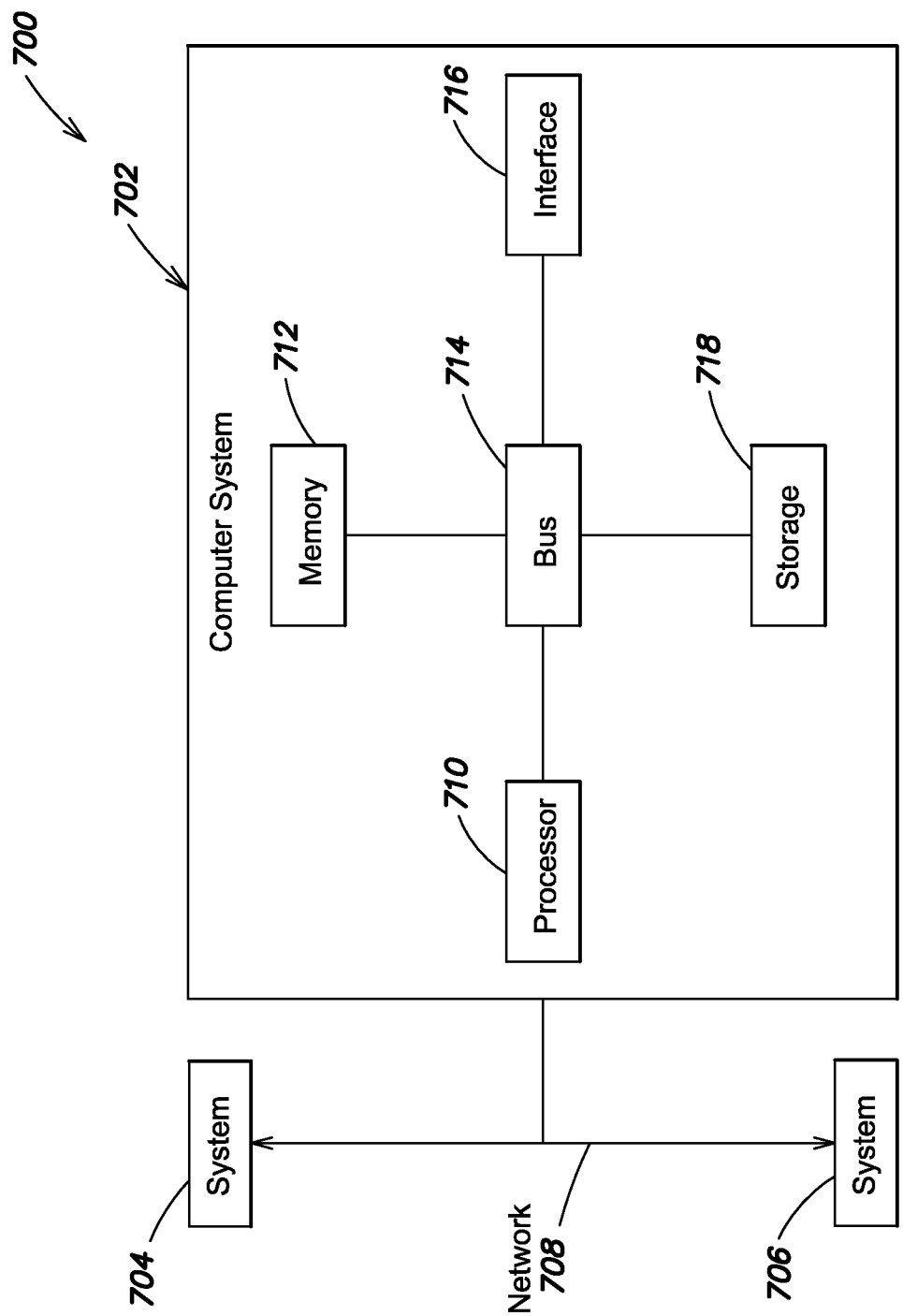
FIG. 7 is a schematic diagram of an exemplary computer system that may be configured to perform processes and functions disclosed herein.

Referring to FIG. 7, there is illustrated a block diagram of a distributed computer system 700, in which various aspects and functions are practiced. As shown, the distributed computer system 700 includes one or more computer systems that exchange information. More specifically, the distributed computer system 700 includes computer systems 702, 704 and 706. As shown, the computer systems 702, 704 and 706 are interconnected by, and may exchange data through, a communication network 708. For example, a energy management system, subsystems, and/or advisor engine can be implemented on 702, which can communicate with other systems (704-706), which operate together to provide the functions and operations as discussed herein.

In some embodiments, the network 708 may include any communication network through which computer systems may exchange data. To exchange data using the network 708, the computer systems 702, 704 and 706 and the network 708 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 702, 704 and 706 may transmit data via the network 708 using a variety of security measures including, for example, TLS, SSL or VPN. While the distributed computer system 700 illustrates three networked computer systems, the distributed computer system 700 is not so limited and may include any number of computer systems and computing devices, networked using any medium and communication protocol.

As illustrated in FIG. 7, the computer system 702 includes a processor 710, a memory 712, a bus 714, an interface 716 and data storage 718. To implement at least some of the aspects, functions and processes disclosed herein, the processor 710 performs a series of instructions that result in manipulated data. The processor 710 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 710 is connected to other system components, including one or more memory devices 712, by the bus 714.

The memory 712 stores programs and data during operation of the computer system 702. Thus, the memory 712 may be a relatively high performance, volatile, random access memory such as a dynamic random access memory (DRAM) or static memory (SRAM). However, the memory 712 may include any device for storing data, such as a disk drive or other non-volatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the bus 714. The bus 714 may include one or more physical busses, for example, busses between components that are integrated within the same machine, but may include any communication coupling between system elements including specialized or standard computing bus technologies such as IDE, SCSI, PCI and InfiniBand. The bus 714 enables communications, such as data and instructions, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage 718 includes a computer readable and writeable nonvolatile, or non-transitory, data storage medium in which instructions are stored that define a program or other object that is executed by the processor 710. The data storage 718 also may include information that is recorded, on or in, the medium, and that is processed by the processor 710 during execution of the program. More specifically, the information may be stored in one or more data structures specifically configured to conserve storage space or increase data exchange performance.

The instructions stored in the date storage may be persistently stored as encoded signals, and the instructions may cause the processor 710 to perform any of the functions described herein. The medium may be, for example, optical disk, magnetic disk or flash memory, among other options. In operation, the processor 710 or some other controller causes data to be read from the nonvolatile recording medium into another memory, such as the memory 712, that allows for faster access to the information by the processor 710 than does the storage medium included in the data storage 718. The memory may be located in the data storage 718 or in the memory 712, however, the processor 710 manipulates the data within the memory, and then copies the data to the storage medium associated with the data storage 718 after processing is completed. A variety of components may manage data movement between the storage medium and other memory elements and examples are not limited to particular data management components. Further, examples are not limited to a particular memory system or data storage system.

Although the computer system 702 is shown by way of example as one type of computer system upon which various aspects and functions may be practiced, aspects and functions are not limited to being implemented on the computer system 702 as shown in FIG. 7. Various aspects and functions may be practiced on one or more computers having different architectures or components than that shown in FIG. 7. For instance, the computer system 702 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 702 may be a computer system including an operating system that manages at least a portion of the hardware elements included in the computer system 702. In some examples, a processor or controller, such as the processor 710, executes an operating system. Examples of a particular operating system that may be executed include a Windows-based operating system, such as, Windows NT, Windows 2000 (Windows ME), Windows XP, Windows Vista, Windows 7 or 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C # (C-Sharp), Objective C, or Javascript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system for delivering expert advice responsive to user content selection, the system comprising:
    at least one processor operatively connected to a memory;
    a UI component, executed by the at least one processor, configured to receive a user selection of energy management information as part of a request for information;
    a routing component, executed by the at least one processor, configured to determine routing information for the request for information based on, at least in part, the user selection of energy management information, wherein determining routing information includes determining automatically a subject matter match between the user selection of energy management information and a responder for the request for information; and
    a communication component, executed by the at least one processor, configured to communicate the request for information to the responder and return responsive information generated by the responder to the user.

2. The system according to claim 1, wherein the UI component is configured to:
    display within a user interface energy management information regarding power and consumption; and
    accept within the user interface selection of energy management information.

3. The system according to claim 2, wherein the UI component is configured to display creation tools for generating the request for information, wherein the creation tools are configured to respond to user selection within the user interface displaying energy management information.

4. The system according to claim 1, further comprising an analysis component configured to identify, automatically, information associated with the user selection of energy management information.

5. The system according to claim 4, wherein the analysis component is configured to generate a package of information as part of the request for information, wherein the package of information includes the information associated with the user selection of energy management information.

6. The system according to claim 4, wherein the analysis component is configured to access user context including at least one of user context associated with the user selection of energy management information and user profile information.

7. The system according to claim 6, wherein the routing component is configured to determine the routing information by determining a match between at least the user context and profile information on candidate responders.

8. The system according to claim 6, wherein the routing component is configured to determine the routing information by determining compatibility between the requesting user and at least one candidate responder.

9. The system according to claim 1, wherein the communication component is configured to communicate a response to the user request for information in-line.

10. The system according to claim 9, wherein the UI component is configured to display visual indicators for accessing the response within a display from which the user selected the energy management information.

11. A computer implemented method for delivering expert advice responsive to user content selection, the method comprising acts of:
receiving, by a computer system, a user selection of energy management information as part of a request for information;
determining, by the computer system, routing information for the request for information based on, at least in part, the user selection of energy management information, wherein determining the routing information includes an act of automatically determining a subject matter match between the selected energy management information and a responder for the request for information; and
communicating, by the computer system, the request for information to the responder and returning responsive information generated by the responder to the user.

12. The method according to claim 11, wherein the method further comprises:
displaying within a user interface energy management information regarding power and consumption; and
accepting within the user interface selection of energy management information.

13. The method according to claim 12, further comprising displaying creation tools for generating the request for information, wherein the creation tools are configured to respond to user selection within the user interface displaying energy management information.

14. The method according to claim 11, further comprising an analysis component configured to identify, automatically, information associated with the user selection of energy management information.

15. The method according to claim 14, further comprising generating a package of information as part of the request for information, wherein the package of information includes the information associated with the user selection of energy management information.

16. The method according to claim 14, further comprising accessing user context including at least one of user context associated with the selected energy management information and user profile information.

17. The method according to claim 16, wherein the act of determining the routing information includes determining a match between at least the user context and profile information on candidate responders.

18. The method according to claim 16, wherein the act of determining the routing information includes determining compatibility between the requesting user and at least one candidate responder.

19. The method according to claim 11, further comprising communicating a response to the user request for information in-line.

20. A non-transitory computer readable medium having stored thereon sequences of instruction for delivering expert advice responsive to user content selection including instructions that when executed cause at least one processor of a computer system to:
receive a user selection of energy management information as part of a request for information;
determine routing information for the request for information based on, at least in part, the user selection of energy management information, wherein determining the routing information includes automatically determining a subject matter match between the user selection of energy management information and a responder for the request for information; and
communicate the request for information to the responder and return responsive information generated by the responder to the user.

* * * * *